United States Patent [19]

DesOrmeaux

[11] Patent Number: 5,292,429
[45] Date of Patent: * Mar. 8, 1994

[54] PROCESS FOR RECOVERY AND TREATMENT OF A DIVERSE WASTE STREAM

[75] Inventor: Thomas F. DesOrmeaux, Houston, Tex.

[73] Assignee: Seaview Thermal Systems, Blue Bell, Pa.

[ * ] Notice: The portion of the term of this patent subsequent to Oct. 5, 2010 has been disclaimed.

[21] Appl. No.: 618,994

[22] Filed: Nov. 28, 1990

Related U.S. Application Data

[63] Continuation-in-part of Ser. No. 443,584, Nov. 29, 1989.

[51] Int. Cl.$^5$ .............................................. B01D 3/34
[52] U.S. Cl. ..................... 208/356; 208/363; 208/364; 208/366; 208/369; 208/400; 208/401; 208/13; 588/228; 588/230
[58] Field of Search ............... 208/356, 364, 400, 407; 201/31, 41; 196/104, 120, 155; 588/228, 230; 585/240

[56] References Cited

U.S. PATENT DOCUMENTS

| | | | |
|---|---|---|---|
| 1,520,161 | 12/1974 | Tilburg | 208/364 |
| 1,568,886 | 1/1926 | Duckham et al. | 208/364 |
| 1,606,075 | 11/1926 | Howard | 208/364 |
| 1,868,466 | 7/1932 | Leslie | 208/364 |
| 1,873,135 | 8/1932 | Laird | 208/364 |
| 2,095,863 | 10/1934 | Freeman | 208/364 |
| 2,443,970 | 6/1948 | Waddell | 208/364 |
| 3,109,781 | 11/1963 | Nattant | 96/400 |
| 4,412,909 | 11/1983 | Faulkner | 208/407 |
| 4,646,734 | 9/1987 | Gentry | 208/407 |
| 4,726,301 | 2/1988 | Desormeaux | 110/250 |

Primary Examiner—Helane Myers
Attorney, Agent, or Firm—Pravel, Hewitt, Kimball & Krieger

[57] ABSTRACT

A process for removing and recovering specific constituents from a waste stream at higher temperatures than the boiling point of the specific waste within a compound of chemicals and inert materials forming ninety-five (95%) percent of the waste stream in the United States. In the process, the waste is moved at a specified retention time, through a heat zone, thus increasing the temperature of the waste stream. There is further provided a means to separate certain components in that waste stream, whereby the components are vaporized and are released in a gaseous state, either from a liquid or a solid within the waste stream. The gaseous components are then transferred in the gaseous state through a flow of an inert medium, such as nitrogen gas, to inhibit combustion of the components, or to prevent the combination of oxidation, or oxygen being used as a catalyst to form even more hazardous compounds. The gaseous components then are released in a distilled state, which would otherwise be mixed with the waste, or an emulsion with the waste stream, containing a heavy metal such as cadmium, arsenic, lead, or some other type of heavy metal which may be a threat to the environment.

23 Claims, 15 Drawing Sheets

TABLE 1

| PARAMETERS | HT-5 #1 Feedstock | HT-5 #1 Treated | HT-5 #2 Feedstock residue | HT-5 #2 residue |
|---|---|---|---|---|
| Treated | 1/23/90 14:45 | 1/23/90 15:05 | 1/23/90 19:15 | 1/23/90 19:48 |
| Oil & Grease (ug/g) (wet weight) | 139,600.0 | 62.8 | 146,600.0 | 97.0 |
| pH | 8.0 | 10.2 | 7.7 | 10.1 |
| Specific Gravity, g/ml (Density) | 1.53 | 2.37 | 1.60 | 2.37 |
| Water, Karl Fisher, % | 24.6 | 0.4 | 23.3 | 0.2 |
| Volatiles (mg/kg): | | | | |
| Acetone | <12.5 | <0.010 | <12.5 | <0.010 |
| Acrolein | <25.0 | <0.020 | <25.0 | <0.020 |
| Acrolonitrile | <25.0 | <0.020 | <25.0 | <0.020 |
| Benzene | 284.0 | <0.005 | 282.0 | <0.005 |
| Bromodichloromethane | <6.25 | <0.005 | <6.25 | <0.005 |
| Bromoform | <6.25 | <0.005 | <6.25 | <0.005 |
| Bromomethane | <12.5 | <0.010 | <12.5 | <0.010 |
| 2-Butanone | <25.0 | <0.020 | <25.0 | <0.020 |
| Carbon disulfide | <6.25 | <0.005 | <6.25 | <0.005 |
| Carbon tetrachloride | <6.25 | <0.005 | <6.25 | <0.005 |
| Chlorobenzene | <6.25 | <0.005 | <6.25 | <0.005 |

FIG. 7A-1

TABLE 1 (continued)

| PARAMETERS | HT-5 #1 Feedstock Treated 1/23/90 14:45 | HT-5 #1 Treated 1/23/90 15:05 | HT-5 #2 Feedstock residue 1/23/90 19:15 | HT-5 #2 residue 1/23/90 19:48 |
|---|---|---|---|---|
| Chloroethane | <12.5 | <0.015 | <12.5 | <0.010 |
| 2-Chloroethylvinyl ether | <25.0 | <0.020 | <25.0 | <0.020 |
| Chloroform | <6.25 | 0.005 | <6.25 | 0.010 |
| Chloromethane | <12.5 | <0.015 | <12.5 | <0.010 |
| Dibromochloromethane | <6.25 | <0.005 | <6.25 | <0.005 |
| Dibromomethane | <6.25 | <0.005 | <6.25 | <0.005 |
| 1,4-Dichloro-2-butene | <6.25 | <0.005 | <6.25 | <0.005 |
| Dichlorodifluoromethane | <12.5 | <0.015 | <12.5 | <0.010 |
| 1,1-Dichloroethane | <6.25 | <0.005 | <6.25 | <0.005 |
| 1,2-Dichloroethane | <6.25 | <0.005 | <6.25 | <0.005 |
| 1,1-Dicloroethene | <6.25 | <0.005 | <6.25 | <0.005 |
| trans 1,2-Dichloroethene | <6.25 | <0.005 | <6.25 | <0.005 |
| 1,2-Dichloropropane | <6.25 | <0.005 | <6.25 | <0.005 |
| cis-1,3-Dichloropropene | <6.25 | <0.005 | <6.25 | <0.005 |
| trans-1,3-Dichloropropene | <6.25 | <0.005 | <6.25 | <0.005 |
| Ethanol | <25.0 | <0.025 | <25.0 | <0.020 |

FIG. 7A-2

TABLE 1 (continued)

| Treated | HT-5 #1 | | HT-5 #2 | |
| --- | --- | --- | --- | --- |
| | Feedstock | Treated | Feedstock residue | residue |
| | 1/23/90 | 1/23/90 | 1/23/90 | 1/23/90 |
| PARAMETERS | 14:45 | 15:05 | 19:15 | 19:48 |
| Ethyl benzene | 290.0 | <0.005 | 312.0 | <0.005 |
| Ethyl methacrylate | <6.25 | <0.005 | <6.25 | <0.005 |
| 2-Hexanone | <25.0 | <0.020 | <25.0 | <0.020 |
| Iodomethane | <6.25 | <0.005 | <6.25 | <0.005 |
| Methylene chloride | <6.25 | <0.005 | <6.25 | <0.005 |
| 4-Methyl-2-pentanone | <6.25 | <0.005 | <6.25 | <0.005 |
| Styrene | <6.25 | <0.005 | <6.25 | <0.005 |
| 1,1,2,2-Tetrachloroethane | <6.25 | <0.005 | <6.25 | <0.005 |
| Tetrachloroethene | <6.25 | <0.005 | <6.25 | <0.005 |
| Toluene | 617.0 | <0.005 | 630.0 | <0.005 |
| 1,1,1-Trichloroethane | <6.25 | <0.005 | <6.25 | <0.005 |
| 1,1,2-Trichloroethane | <6.25 | <0.005 | <6.25 | <0.005 |
| Trichloroethene | <6.25 | <0.005 | <6.25 | <0.005 |
| Trichlorofluoromethane | <6.25 | <0.005 | <6.25 | <0.005 |
| 1,2,3-Trichloropropane | <6.25 | <0.005 | <6.25 | <0.005 |
| Vinyl acetate | <6.25 | <0.005 | <6.25 | <0.005 |

FIG. 7A-3

TABLE 1 (continued)

| PARAMETERS | HT-5 #1 Feedstock 1/23/90 14:45 | HT-5 #1 Treated 1/23/90 15:05 | HT-5 #2 Feedstock residue 1/23/90 19:15 | HT-5 #2 residue 1/23/90 19:48 |
|---|---|---|---|---|
| Vinyl chloride | <12.5 | <0.010 | <12.5 | <0.010 |
| m-Xylene | 240.0 | <0.005 | 243.0 | <0.005 |
| o,p-Xylene | 595.0 | <0.005 | 606.0 | <0.005 |
| Base/Neutrals (mg/kg): | | | | |
| Acenaphthene | <9.8 | <0.10 | <9.8 | <0.099 |
| Acenaphthylene | <9.8 | <0.10 | <9.8 | <0.099 |
| Acetophenone | <9.8 | <0.10 | <9.8 | <0.099 |
| Aniline | <9.8 | <0.10 | <9.8 | <0.099 |
| Anthracene | <9.8 | <0.10 | <9.8 | <0.099 |
| 4-Aminobiphenyl | <19.6 | <0.20 | <19.6 | <0.20 |
| Benzidine | <9.8 | <0.10 | <9.8 | <0.099 |
| Benzo(a)anthracene | <9.8 | <0.10 | <9.8 | <0.099 |
| Benzo(b)fluoranthene | <9.8 | <0.10 | <9.8 | <0.099 |
| Benzo(k)fluoranthene | <9.8 | <0.10 | <9.8 | <0.099 |
| Benzo(g,h,i)perylene | <9.8 | <0.10 | <9.8 | <0.099 |
| Benzo(a)pyrene | <9.8 | <0.10 | <9.8 | <0.099 |

FIG. 7A-4

TABLE 1 (continued)

| PARAMETERS | HT-5 #1 Feedstock Treated 1/23/90 14:45 | HT-5 #1 Treated 1/23/90 15:05 | HT-5 #2 Feedstock residue 1/23/90 19:15 | HT-5 #2 residue 1/23/90 19:48 |
|---|---|---|---|---|
| Benzyl butyl phthalate | <9.8 | <0.10 | <9.8 | <0.099 |
| Bis(2-chloroethoxy)methane | <9.8 | <0.10 | <9.8 | <0.099 |
| Bis(2-chlorethyl)ether | <9.8 | <0.10 | <9.8 | <0.099 |
| Bis(2-chloroisopropyl)ether | <9.8 | <0.10 | <9.8 | <0.099 |
| Bis(2-ethylhexyl)phthalate | <9.8 | <0.10 | <9.8 | <0.099 |
| 4-Bromophenyl phenyl ether | <9.8 | <0.10 | <9.8 | <0.099 |
| 4-Chloroanaline | <9.8 | <0.10 | <9.8 | <0.099 |
| 1-Chloronaphthalene | <9.8 | <0.10 | <9.8 | <0.099 |
| 2-Chloranaphthalene | <9.8 | <0.10 | <9.8 | <0.099 |
| 4-Chlorophenyl phenyl ether | <9.8 | <0.10 | <9.8 | <0.099 |
| Chrysene | <9.8 | <0.10 | <9.8 | <0.099 |
| Dibenzo(a,j)acridine | <9.8 | <0.10 | <9.8 | <0.099 |
| Dibenzo(a,h)anthracene | <9.8 | <0.10 | <9.8 | <0.099 |
| Dibenzofuran | <9.8 | <0.10 | <9.8 | <0.099 |
| Di-n-butyl phthalate | <9.8 | <0.10 | <9.8 | <0.099 |
| 1,2-Dichlorobenzene | <9.8 | <0.10 | <9.8 | <0.099 |

FIG. 7A-5

TABLE 1 (continued)

| PARAMETERS | HT-5 #1 Feedstock 1/23/90 14:45 | HT-5 #1 Treated 1/23/90 15:05 | HT-5 #2 Feedstock residue 1/23/90 19:15 | HT-5 #2 residue 1/23/90 19:48 |
|---|---|---|---|---|
| 1,3-Dichlorobenzene | <9.8 | <0.10 | <9.8 | <0.099 |
| 1,4-Dichlorobenzene | <9.8 | <0.10 | <9.8 | <0.099 |
| 3,3'-Dichlorobenzidine | <19.6 | <0.20 | <19.6 | <0.20 |
| Diethyl phthalate | <9.8 | <0.10 | <9.8 | <0.099 |
| Dimethyl phthalate | <9.8 | <0.10 | <9.8 | <0.099 |
| p-Dimethylaminoazobenzene | <9.8 | <0.10 | <9.8 | <0.099 |
| 7,12-Dimethylbenz(a)anthra | <9.8 | <0.10 | <9.8 | <0.099 |
| a,a-Dimethylphenethylamine | <9.8 | <0.10 | <9.8 | <0.099 |
| 2,4-Dinitrotoluene | <9.8 | <0.10 | <9.8 | <0.099 |
| 2,6-Dinitrotoluene | <9.8 | <0.10 | <9.8 | <0.099 |
| Di-n-octyl phthalate | <9.8 | <0.10 | <9.8 | <0.099 |
| Diphenylamine | <9.8 | <0.10 | <9.8 | <0.099 |
| 1,2-Diphenylhydrazine | <9.8 | <0.10 | <9.8 | <0.099 |
| Fluoranthene | <9.8 | <0.10 | <9.8 | <0.099 |
| Fluorene | 10.8 | <0.10 | 14.4 | <0.099 |
| Hexachlorobenzene | <9.8 | <0.10 | <9.8 | <0.099 |

FIG. 7A-6

TABLE 1 (continued)

| PARAMETERS | HT-5 #1 Feedstock 1/23/90 14:45 | HT-5 #1 Treated 1/23/90 15:05 | HT-5 #2 Feedstock residue 1/23/90 19:15 | HT-5 #2 residue 1/23/90 19:48 |
|---|---|---|---|---|
| Hexachlorobutadiene | <9.8 | <0.10 | <9.8 | <0.099 |
| Hexachlorocyclopentadiene | <9.8 | <0.10 | <9.8 | <0.099 |
| Hexachloroethane | <9.8 | <0.10 | <9.8 | <0.099 |
| Indeno(1,2,3,cd)pyrene | <9.8 | <0.10 | <9.8 | <0.099 |
| Isorphorone | <9.8 | <0.10 | <9.8 | <0.099 |
| 3,Methylcholanthrene | <9.8 | <0.10 | <9.8 | <0.099 |
| 2-Methylnaphthalene | 153.0 | <0.10 | 185.0 | <0.099 |
| Methel methanesulfonate | <9.8 | <0.10 | <9.8 | <0.099 |
| Naphthalene | 87.9 | <0.10 | 93.7 | <0.099 |
| 1-Naphthylamine | <9.8 | <0.10 | <9.8 | <0.099 |
| 2-Naphthylamine | <9.8 | <0.10 | <9.8 | <0.099 |
| 2-Nitroanaline | <39.2 | <0.40 | <39.2 | <0.40 |
| 3-Nitroanaline | <39.2 | <0.40 | <39.2 | <0.40 |
| 4-Nitroanaline | <39.2 | <0.40 | <39.2 | <0.40 |
| Nitrobenzene | <9.8 | <0.10 | <9.8 | <0.099 |
| N-Nitrosodi-n-butylamine | <9.8 | <0.10 | <9.8 | <0.099 |

FIG. 7A-7

TABLE 1 (continued)

|  | HT-5 #1 | | HT-5 #2 | |
| --- | --- | --- | --- | --- |
| Treated | Feedstock | Treated | Feedstock residue | residue |
|  | 1/23/90 | 1/23/90 | 1/23/90 | 1/23/90 |
| PARAMETERS | 14:45 | 15:05 | 19:15 | 19:48 |
| N-Nitrosodimethylamine | <9.8 | <0.10 | <9.8 | <0.099 |
| N-Nitrosodi-n-propylamine | <9.8 | <0.10 | <9.8 | <0.099 |
| N-Nitrosodiphenylamine | <9.8 | <0.10 | <9.8 | <0.099 |
| N-Nitrosopiperidine | <9.8 | <0.10 | <9.8 | <0.099 |
| Petachlorobenzene | <9.8 | <0.10 | <9.8 | <0.099 |
| Pentachloronitrobenzene | <19.6 | <0.20 | <19.6 | <0.20 |
| Phenacetin | <9.8 | <0.10 | <9.8 | <0.099 |
| Phenanthrene | 36.7 | <0.10 | 45.1 | <0.099 |
| 2Picoline(2-methylpyridine) | <9.8 | <0.10 | <9.8 | <0.099 |
| Pyrene | <9.8 | <0.10 | <9.8 | <0.099 |
| 1,2,4,5-Tetrachlorobenzene | <9.8 | <0.10 | <9.8 | <0.099 |
| 1,2,4-Trichlorobenzene | <9.8 | <0.10 | <9.8 | <0.099 |
| Acid Extractables (mg/kg): | | | | |
| Benzoic acid | <49.0 | <0.50 | <49.0 | <0.50 |
| Benzyl alcohol | <9.8 | <0.10 | <9.8 | <0.099 |
| 4-Chloro-3-methylphenol | <9.8 | <0.10 | <9.8 | <0.099 |

FIG. 7A-8

TABLE 1 (continued)

| Treated PARAMETERS | HT-5 #1 Feedstock 1/23/90 14:45 | HT-5 #1 Treated 1/23/90 15:05 | HT-5 #2 Feedstock residue 1/23/90 19:15 | HT-5 #2 residue 1/23/90 19:48 |
|---|---|---|---|---|
| 2-Chlorophenol | <9.8 | <0.10 | <9.8 | <0.099 |
| 2,4-Dichlorophenol | <9.8 | <0.10 | <9.8 | <0.099 |
| 2,6-Dichlorophenol | <9.8 | <0.10 | <9.8 | <0.099 |
| 2,4-Dimethylphenol (Xylenol) | <9.8 | <0.10 | <9.8 | <0.099 |
| 2,4-Dinitrophenol | <49.0 | <0.50 | <49.0 | <0.50 |
| 2-Methyl-4,6-dinitrophenol | <49.0 | <0.50 | <49.0 | <0.50 |
| 2-Methylphenol (o-Cresol) | <9.8 | <0.10 | <9.8 | <0.099 |
| 4-Methylphenol (p-Cresol) | <9.8 | <0.10 | <9.8 | <0.099 |
| 2-Nitrophenol | <9.8 | <0.10 | <9.8 | <0.099 |
| 4-Nitrophenol | <49.0 | <0.50 | <49.0 | <0.50 |
| Pentachlorophenol | <49.0 | <0.50 | <49.0 | <0.50 |
| Phenol | <9.8 | <0.10 | <9.8 | <0.099 |
| 2,3,4,6-Tetrachlorophenol | <9.8 | <0.10 | <9.8 | <0.099 |
| 2,4,5-Trichlorophenol | <9.8 | <0.10 | <9.8 | <0.099 |
| 2,4,6-Trichlorophenol | <9.8 | <0.10 | <9.8 | <0.099 |

FIG. 7A-9

PROCESS FOR RECOVERY AND TREATMENT OF A DIVERSE WASTE STREAM

This is a continuation-in-part of co-pending U.S. patent application Ser. No. 443,584, filed on Nov. 29, 1989, entitled "Process for Recovery and Treatment of Hazardous and Non-hazardous Components From A Waste Stream," by the same inventor, hereby incorporated herein by reference.

BACKGROUND OF THE INVENTION

1. Field of the Invention

The process of the present invention relates to hazardous and non-hazardous waste. More particularly, the present invention relates to a process for treating a waste stream containing hazardous and non-hazardous components, through increasing the temperature of the waste stream over a given period of time to desirable temperatures, through a plurality of heat phases in the system, so as to reduce the stream to a liquid and gaseous state, so that various components can be removed from the stream at particular temperatures, and may be condensed for reclamation.

2. General Background

Various industries, through their operation, produce waste stream from materials utilized in the industry. Therefore, there is an ever-increasing problem of the treatment of these waste streams in order to properly dispose of components which are harmful to the environment, and in order to recover components which may be useful when recovered. The Environmental Protection Agency, through their guidelines, have characterized waste as either hazardous waste or non-hazardous waste.

For example, in the field of refining oil and natural gas, as well as the condensate, which is recovered during the process of refining the waste stream, there are certain components of the waste stream which can not be refined or processed, and which are then destined for discard and disposal and may cause possible environment problems in the future due to the process of leaking into the water table adjacent the pits. In fact, most petro-chemical waste involved heavily ladened volatile organic compounds (or oil), which exist in emulsions with the inert earth, water, and other chemical compounds which become hazardous to the environment particularly from emissions through evaporation or from leakage into soil and ultimately going into ground water (drinking water)

Heretofore, there has not been a process which could properly process a waste stream, wherein the stream is subjected to various degrees of heat, over certain period of times, so that all the hazardous hydrocarbon components in the stream are volatilized at particular temperatures, and may then be recondensed into a recoverable and reusable component, or may be confined as a hazardous material which must otherwise be placed in storage and removed as a source of harm to the environment. The process of the present invention addresses a new and improved method of management of such diverse waste streams, and solves the problems that are being confronted in the present state of the art.

It is known in the art that there is provided a conveyor system for moving oil well cuttings through a chamber wherein the cuttings are fired by flames in order to drive them into the ashen state and thus be removed as dry cuttings or dry waste. The shortcoming of this particular apparatus is that when the open flame or oxidation occurs near the cite of a borehole, in the case of oilfield wastes, it creates an extremely hazardous situation. Furthermore, and perhaps even worse, the oxidation process can actually serve as a catalyst to form chemical compounds, thus not in-line with the separation process in reducing the waste, but in line with a now rejoining process of chemical catalyst of oxidation during the process of oxidizing (i.e., incineration process).

Several patents have been granted to the present inventor, which cover the incineration of oil well cuttings. The purpose for citing these patents is to point out current technology which can be utilized by the process of the present invention in serving as the means to provide the multi-phase heat required to thermally distill a diverse waste stream. However, although the aforesaid patents are directed to oil and gas wastes (containing hazardous constituents), the process of the present invention addresses a waste stream having hazardous and non-hazardous components in the stream, and may or may not contain hydrocarbons in the waste stream.

U.S. Pat. No. 4,606,283, entitled "A System For Extracting Contaminants And Hydrocarbons From Cutting Waste In Oil Well Drilling", relates to the distillation of oil well cuttings through the use of laterally disposed augers where the cuttings are processed prior to being opened into waste containers.

U.S. Pat. No. 4,726,301, entitled "A System For Extracting Contaminants And Hydrocarbons From Cutting Waste In Oil Well Drilling", also relates to an improvement of the process in the '283 patent, in that the gas released from the heating process is passed through a heat exchanger, in order to recondense some of the gaseous waste, rather than release the waste to atmosphere.

However, as stated earlier, it is suggested that the systems used in U.S. Pat. No. 4,606,283, and U.S. Pat. No. 4,726,301, can additionally be used for refining, production, and transportation of wastes in various industries. Due to increased technological advancements, which are recited as follows, the technology can now be utilized to separate hazardous waste being classified under the Superfund by the U.S. Environmental Protection Agency, and to reduce the actual waste, thereby making it economical and more feasible to manage.

SUMMARY OF THE PRESENT INVENTION

The process of the present invention can be utilized in the reclamation of hazardous and non-hazardous waste in a straightforward manner. What is provided is a process for conveying waste material from room temperature to a higher temperature then the boiling point of various chemicals and constituents which, when combined with solids and water form ninety-five (95%) percent of the waste stream in the United States. In the process, the waste is moved at a specific rate and at a range of retention times that are influenced by the nature and quantity of components, through multiple heat zones, thus increasing the temperature of the waste stream incrementally. There is further provided a means to separate certain components in that waste stream at their boiling point temperature, whereby the components evaporate and are released in a gaseous state, either from a liquid or a solid within the waste stream. The gaseous components are then transferred in the gaseous state through a flow of an inert medium, including but not limited to nitrogen gas or carbon dioxide, to inhibit combustion of the components, or to prevent the combination of oxidation, or oxygen being used as a catalyst to form even more hazardous compounds. The gaseous components then are released in a distilled state, which would otherwise be mixed with the waste, or an emulsion with the waste stream, containing heavy metal such as cadmium, arsenic, lead, or some other type of heavy metal which may be a threat to the environment.

The process provides a means for heating a cylindrical container, such as the type found in U.S. Pat. No. 4,606,283, and incorporated hereinto by reference thereinto, wherein there is provided a means for controlling the speed of an auger contained within the chamber, so that the waste material contained in the chamber, reaches a specific temperature, while being conveyed through the chamber, so that the volatile constituents may become a gas or the like. The gas is transported through a piping structure where the combined gases are to be cooled and therefore transforming the vaporized waste constituents back into a liquid or solid, and then ca be recovered. Those components which are not released in the passage through the initial chamber, would then be gravity fed into a second cylindrical chamber where the waste is now exposed to higher temperature, and for again a certain-determined amount of time, so that other components such as heavier hydrocarbons are rendered into a vapor state and then recondensing those components and recovering the liquids a separate recapture tank, again under ambient atmosphere such as nitrogen.

Further, the waste stream is then gravity fed into a third stage of the process, wherein the auger will move the waste material through the apparatus, thereby increasing the temperature and releasing further volatile organic chemicals or inert materials which have boiling points at that operating temperature, and separating those liquids or solids that turn to gases. This process is repeated until all of the desired compounds which are vaporized and recondensed at various temperatures are removed from the waste stream, and the residual solids stream may then be disposed of in the environment.

However, through the entire process, the inert gas flow is the transportation vehicle in which the liquid vapor is carried, while the dry inert gas or gases flowing through the system and blanketing the entire system. This serves two purposes. It provides a dry gas which will absorb and will actually transport the vapor from the heated cylinder to the condensing and separation recovery tank of that specific chamber. Second, it serves as a deactivator of any oxygen exposed to the temperature and the chemicals or volatile organic compounds, thus eliminating the potential for oxidation such as found in incineration/combustion. The nitrogen does not cause oxidation, and thereby eliminates the creation and/or formation of other elements (such as SOx, NOx, dioxins, furans, etc.). The separation process uses a series of heated chambers whereby, through the increased temperature of each chamber as the material flows, the material is moved laterally through the chamber via an auger system, gravity fed down to the following chamber, but carries with it the heat within it to be increased to a higher level. More and more of the compounds are released as the waste travels through the subsequent chambers, thus cleaning thoroughly the inert material, which is normally earth, and allowing it to go back into the environment with a dramatically reduced detrimental effect on the ecology.

Further, rather than having one cylinder which may be five hundred feet long (500') it could be more structurally and thermodynamically effective to provide ten (10) cylinders fifty feet long (50') each, one on top of the other, continually graduating to a higher temperature and having the waste material graduate to a higher temperature.

Also, because the chambers are sitting virtually directly on top of one another, the heat chambers in the process that would take less ground space, thereby not being restricted to areas where say the amount of space requirement is critical.

Each and every heat chamber is separate in that the feed of the electrical power to that chamber is separated from the rest of the electrical feed to the other electrical chambers which create the heat. Also, the hydraulic feed, conveying the material by auger to the next auger is completely separate from all of the other chambers as well. For example, chamber number one could be set for a desired a temperature and residence time, chamber number two for a higher temperature and shorter (or equal) residence time and chamber number three set for highest temperature and shortest residence time. This is simply a matter of setting the computer control of the auger in revolutions per minute thereby either increasing the length of time that the material or waste is exposed, to a certain temperature which is an independent variable from the operating temperature. Thus, being totally separate from one another allows the variability or the variety of waste or compounds of waste which may be exposed, to be specifically handled for a specific application. This enables a variety of applications, because of the variation of the retention time being handled by a changing of the revolutions per minute through the hydraulic feed process and the heat being able to be increased or decreased to the tenth of an RPM and controlled within each particular and separate chamber.

Also, the inert gas producing system, (whether it be an on-site generated nitrogen, or whether it be a cryogenic and transported nitrogen) is a dry inert gas which does not have any, or very little, oxygen in it, thereby not allowing the oxidation process to take place. Normally, combustion would take place at temperatures at the levels under which the apparatus works. It is simply a suffocation process to where the apparatus cannot create any type of oxidation or flash since there is no oxygen present during the apparatus's processing time.

Also, the inert gas serves as a very good transporting agent or carrying agent. The specific relative humidity or liquid within the inert gas is very low thereby allowing the inert gas to contain more of a carrying capacity for a liquid vapor. The process is able to transport, through a flow of the inert gas in a system, and to direct the flow of this vapor to a separate cooling, condensing and then retrieval tank.

In summary, the objects and feature of the present invention can be recited as follows:

It is an object of the present invention that the HT-5 Thermal Distillation system is ideally suited for and capable of treating materials with solid contents ranging from 10% to 100% and wastes with oil contents ranging from 0% to 60%;

It is a further object of the present invention that the system will readily accept and process solids ranging in size from sub-micron up to 1.5 inches.;

It is a further object of the present invention that the versatility of the process allows for its application to a wide variety of waste products;

It is a further object of the present invention that the HT-5 system's modular characteristics allow for the sizing of the system based on site specific throughout requirements ranging between 30 tons and 400 tons per day;

It is a further object of the present invention that the applications are E.P.A. listed refinery wastes KO-48 through KO-52, creosote contaminated soils, hydrocarbon contaminated soils, mercury contaminated soils, and oil and gas exploration wastes;

It is a further object of the present invention that analytical data generated from processing these hazardous wastes document that the processed inert solid effluent contains non-detectable concentrations of volatile and semi-volatile hydrocarbons; and It is a further object of the present that the degree of hydrocarbon removal will allow for the continued land disposal of refinery wastes beyond the August, 1990 land ban date and is considered a BDAT equivalent to incineration.

It is a feature of the present invention that the system reuses of the nitrogen sweep gas resulting in the process possessing an insignificant source of air emissions, over 99.9% oil removal and subsequent recovery, no oxidation of heavy metals, the ability to achieve required treatment valves on refinery wastes, and the process can be utilized as a recycling and resource recovery system and can qualify for exemptions from Federal and State treatment Part "B" permits in a variety of applications;

It is an additional feature of the present invention that waste retention time and amount of Btu's subjected to the waste are the two parameters that control the degree of removal and subsequent recovery of various constituents;

It is another feature of the present invention the majority of the hydrocarbon contaminated wastes generated by the petroleum industry and the wood treating industry can be processed by the HT-5 High Temperature Thermal Distillation System; and It is another feature of the present invention that the HT-5 Thermal Distillation system will render the inert solid effluent stream acceptable for land disposal and will allow for the recovery of valuable and reusable hydrocarbons.

Additional objects of the present invention are the removal of all volatile, base/neutral, acid extractable hydrocarbon constituents analyzed for in EPA method 8240 and 8270 (See TABLE 1);

Another additional object of the present invention are the recovery of all volatile, base/neutral, acid extractable hydrocarbon constituents analyzed in EPA method 8240 and 8270;

Another additional object of the present invention are the removal, prior to release to the environment, of any toxic compounds as further described in EPA Appendix 8 (See 40 CFR). This removal is accomplished via sub 0 degree F. refrigeration thus allowing for the recovery and reuse of specific constituents. Heretofore, Industries BACT (Best Available Control Technology) has been oxidation (such as incinerators afterburners) or actuated carbon absorption systems. Oxidation process generate SOx and NOx as by-products of oxidation/burning. Both NOx and SOx are considered to have detrimental effects on the environment and the general public's health; and Another additional object of the present invention are the capability of accomplishing the aforementioned without any element of combustion.

These and other objects of this invention will be readily apparent to those skilled in the art from the detailed description and claims which follow.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 1A is an isolated view of the feed auger utilized in the preferred embodiment of the present invention;

DETAILED DESCRIPTION OF THE PREFERRED

Figure 1:
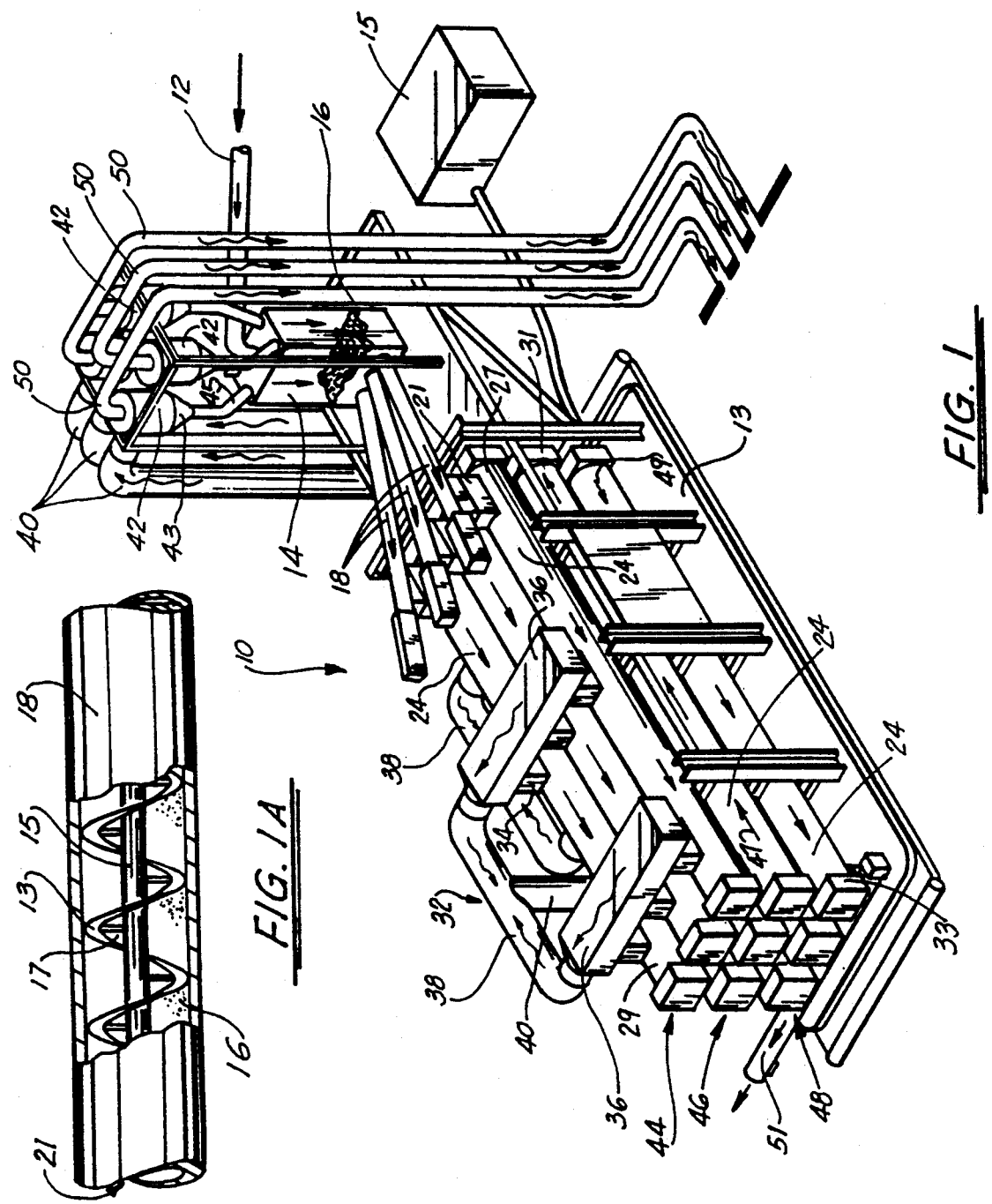
FIG. 1 is an overall view of the preferred embodiment of the heating chamber assembly in the preferred embodiment of the system of the present invention.

The technology, known as the HT-5 Thermal Distillation Process, subjects various waste to electrically generated heat in a nitrogen atmosphere. The HT-5 distillation system is designed to vaporize compounds via three segregated distillation chambers and recover, via condensation, the segregated effluent (e.g. oil, water, and solids). This dynamic process, therefore, can be utilized for the purpose of segregating any hazardous compound with a boiling point of 100° F. to 2100° F. from the non-hazardous compounds in a waste product.

The HT-5 Thermal Distillation Unit is designed to meet the highest standards of construction and safety. All electrical systems are designed to Class 1, Group D, Division 2 specifications. All piping follows ANSI D31.3 guidelines, and all pressure vessels are designed in accordance with ASME Section 8. The code references are defined as equipment specification for operation on a U.S. refinery and may be attached to fit another operating environment.

The process involved in the HT-5 Thermal Distillation Unit accepts a contaminated waste stream in an initial dump bin. Hydraulically powered augers transport the waste into a feed silo where further mixing and equalization of flow occurs. At this point, a nitrogen atmosphere is introduced and the entire system is sealed until the segregated effluent leave the system. The feed silo utilizes a transfer auger to, again, transfer the waste into a feed hopper where it is apportioned to three parallel distillation sections.

By using gravity and a system of annular augers, the waste is transferred through three externally heated distillation heating chambers which operate in series.

The continuous introduction of a nitrogen gas creates a low pressure (below atmospheric) condition. This atmosphere prevents combustion/oxidation and facilitates the rapid vaporization of volatile and semi-volatile compounds.

The waste temperatures and resulting conditions for each of the three heating chambers are as follows:

| PROCESS SECTION | WASTE TEMPERATURES | RESULTS |
|---|---|---|
| Zone #1 | Ambient to 300° F. | Volatilization of water & light hydrocarbons |
| Zone #2 | 300° F. to 900° F. | Volatilization of remaining water and light hydrocarbons |
| Zone #3 | 900° F. to 2100° F. | Volatilization of remaining hydrocarbons |

For purposes of explanation we have used hydrocarbon to describe the entire body of volatile and semi-volatile organics which can be separated and recovered via this distillation technology.

Specific operating temperatures vary with each waste stream; however, the ability to operate at up to 2100° F. results in maximum efficiency and versatility.

Exact temperatures, pressures, and flows are electronically monitored and controlled via over 1000 separate points throughout the HT-5 process. Data is represented in a graphics-based operator interface system.

The final inert solid effluent system leaves the HT-5 an exit port after the third heating chamber and is transported by a conveyor cooling auger to a collection bin for ultimate disposal. The gases from each distillation chamber are sent to a cyclone/dust control system for particle removal. After the cyclones, the gases are gathered and moved through an air cooled condenser, which lowers the gas temperature to 20° F. above ambient air temperature. A series of two-and three-phase separators segregate three different liquid fractions from the remaining gases. The degree of separation can be increased or decreased and is dependent upon the application and required specification.

The light and heavy oils, as well as other recyclable materials, can be returned to the customer, separately or combined, to be used as fueloil or refinery feed stock. Recovered water is typically returned to the customer's API Separator (in refinery applications) or further treated for ultimate discharge.

The remaining gases from the separation process are order to recover liquified petroleum gases (LPG's) which are also returned to the customer. The remaining nitrogen-rich gases are recycled with a small percentage being sent to flare or a fuel gas system.

In the preferred embodiment of the system of the present invention, the system provides a process for separation and recovery of waste in an inert atmosphere. In this process, hazardous and non-hazardous waste components are introduced into a heating chamber, such as the type found in U.S. Pat. No. 4,606,283, which is incorporated hereinto by reference, wherein there is provided a means for controlling the speed of an auger contained within the chamber, so that the waste material contained in the chamber may reach a specific temperature, for a specific duration of time, while being conveyed to the chamber.

Figure 4:
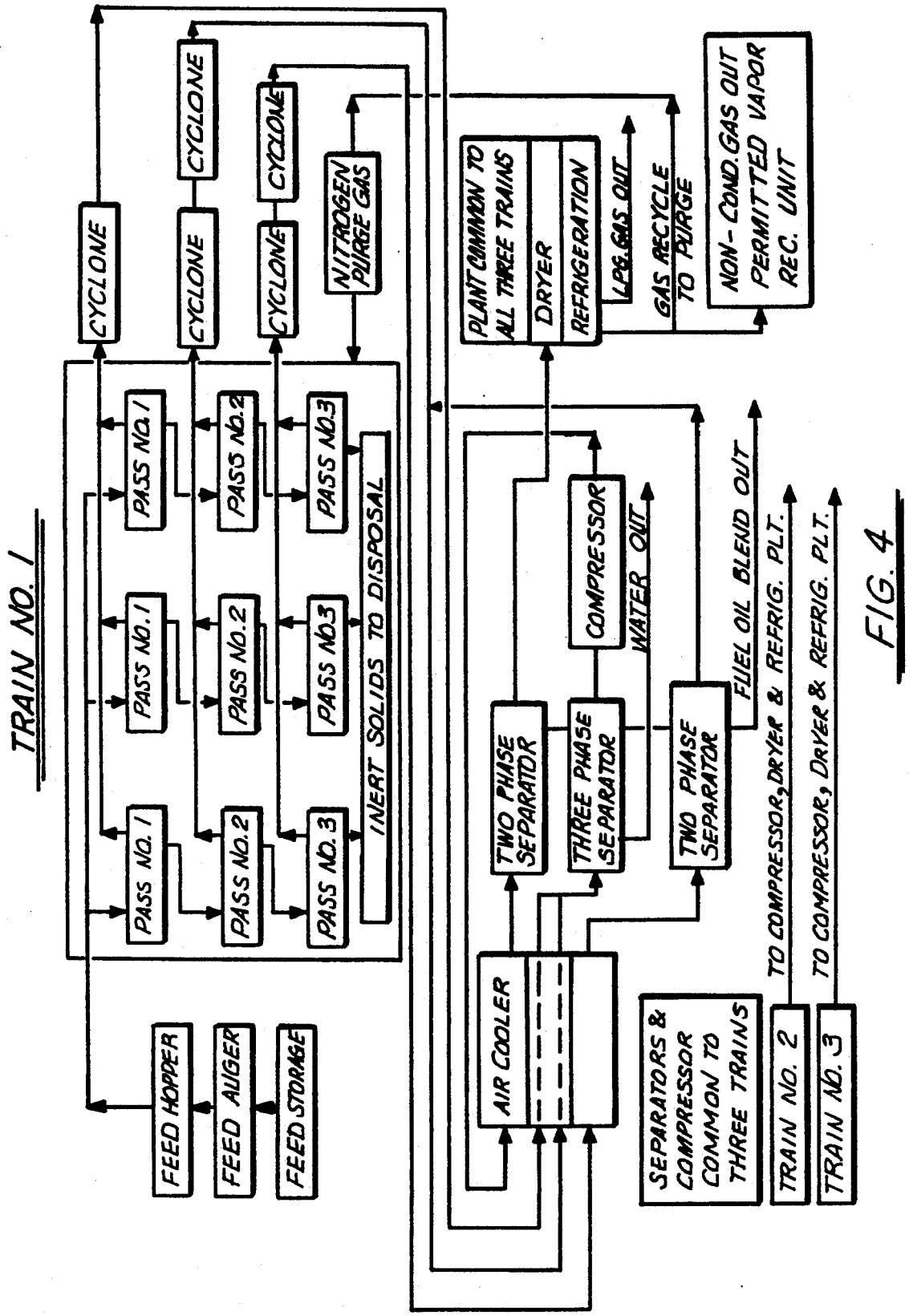
FIGS. 4 and 5 represent schematic views of the process of the preferred embodiment of the present invention.
Figure 5:
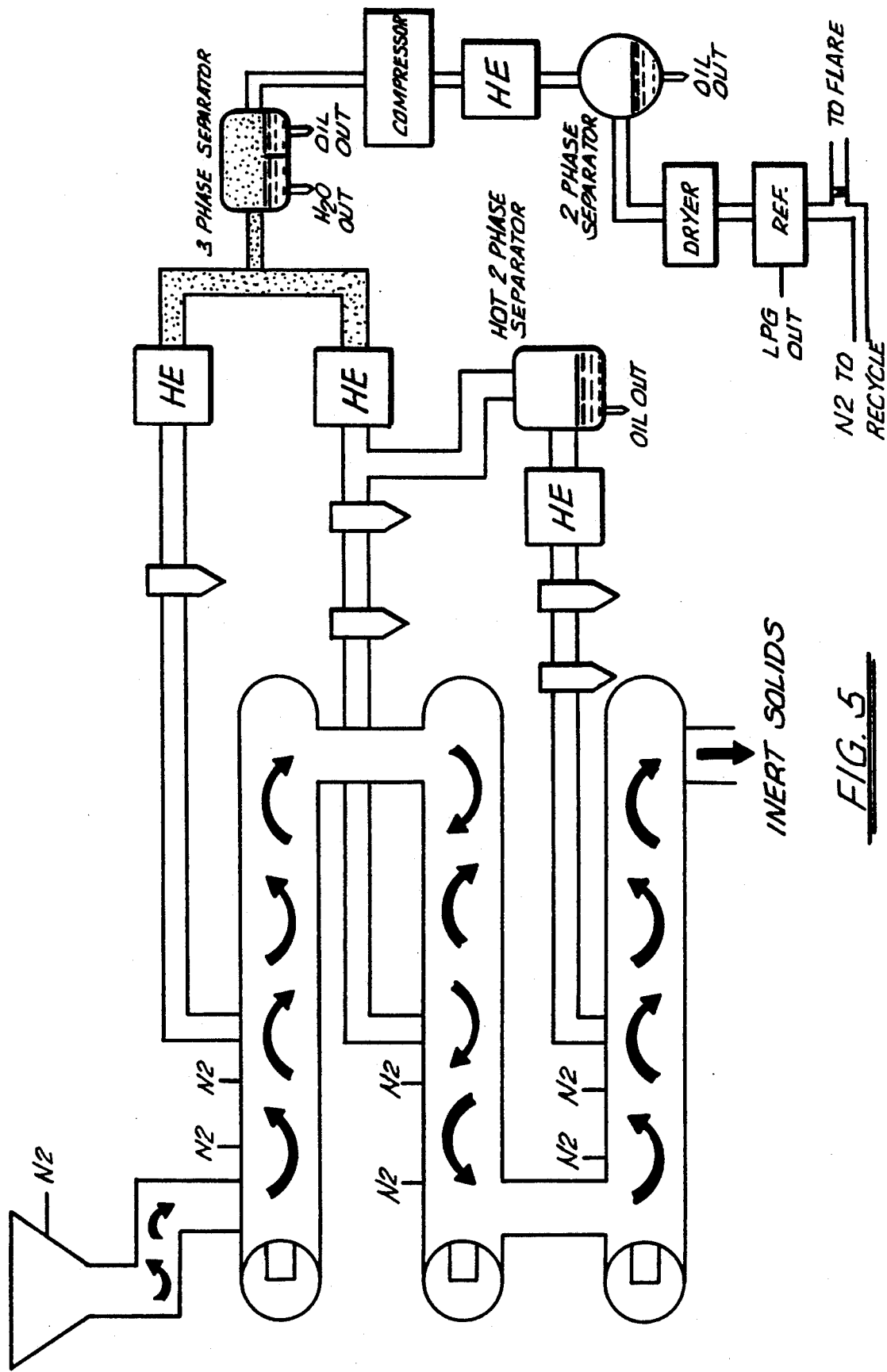

Initially, after the waste stream has been into the first heating phase or chamber, the material in the chamber is increased in temperature. As the material is heated, an inert or carbon dioxide gas, such as nitrogen gas or carbon dioxide gas, would be utilized to sweep the material and remove and separate the volatile compounds. The nitrogen carrier gases can carry only a certain quantity of the volatile compound before it becomes saturated. By providing the step of "sweeping" with fresh inert gas and steam and the capability to adjust the volume of carrier gates, the volatile compounds can be removed and the inert gas and steam filled with fresh volatile compounds. The compounds referenced in TABLE 1 (see FIGS. 7A-1 through 7A-4), represent only a partial list of the compounds, and the system has the capability of removing other volatile compounds, such as PCB's, Dioxins, and furans (See Table 1).

During the time period that the waste stream is present in this first chamber, the stream is being conveyed via a screw auger from the first end of the chamber to the second end of the chamber. During this time, any solids are being crushed and agitated so that the heat within the chamber acts on the solids to remove the volatile compounds and to reduce the size of the solid materials. Increased surface area also increases rate of heat exchanged from chamber to waste while homogeneously obtaining the waste temperatures desired and required for hazardous constituent removal.

Following the removal of the volatile compounds with the inert gas and steam sweep during this first phase of the distillation process, the resulting effluents of the process would be water, oil, and dry granular solids, such as dirt, clay, small rocks, that would be less than one inch in diameter, and would not be oxidized through the process. Furthermore, in addition to the inert solid compounds, which are not volatilized, the volatile compounds which are removed through the "sweeping" step, are not oxidized either, because the system sweeps the waste material in the chamber with an inert gas, and therefore excludes the necessary component burning oxygen, which would result in oxidation i.e., ignition.

The examples of volatile hydrocarbons would be those hydrocarbons which boil at a relatively low temperature, such as gasoline containing Benzene, Toluene, Xylenol, and the semi-volatile hydrocarbons would be the hydrocarbons which burn at a high temperature, for example tar containing Chrysene, etc.

Overall, the process, in the preferred embodiment would utilize a distillation train comprising of two to three sets of three paths heating chambers operating in parallel (see FIG. I). In the operation of the system, contaminated waste, as stated earlier, would be heated in three different temperature zones.

In the preferred embodiment, as illustrated in FIG. 1, the overall system of the present invention is illustrated by the numeral 10. As illustrated, system 10 would include a first feed pipe 12 which would be utilized to introduce volatile or semi-volatile compounds contained in large quantities of inert compounds such as dirt, clay, rocks, sand, or drilling mud. Only for purposes of description in this Specification, the waste materials will be designated as petroleum industry generated waste, since this is foreseen as a principal use of the present invention. Feed line 12 would feed the petroleum industry generated waste into a feed hopper 14, which would be a four wall container for containing the waste material as it is fed into the system.

As is illustrated in FIGS. 1 and 1A, the waste stream is introduced into the system through a hopper 14 which retains the waste until the waste is conveyed into the first heat phase or zone of the heating chamber. In the preferred embodiment it is foreseen that the waste would be conveyed from the hopper 14 by the use of a plurality of "ribbon screws" or augers 18, which, as seen in isolated view in FIG. 1A, provides for an auger blade 13 positioned a distance from the auger shaft 15 and defining a space 17 therebetween so that any waste material being conveyed is more apt not to cling to the auger blade 13, but to move into the heating chamber at the end of the feed augers 18 as the waste is being conveyed into the primary thermal distillation unit. Furthermore, it is foreseen that the chamber 21 which would house the "ribbon screws" or feed augers 18 would include a heating means for heating the auger blade 13 to reduce adherence of waste material thereto, and the possibility of sweeping the chamber with an inert gas, such as Nitrogen, in order to eliminate the possibility of ignition of any volatile components in the heated feed auger chamber.

Figure 3:
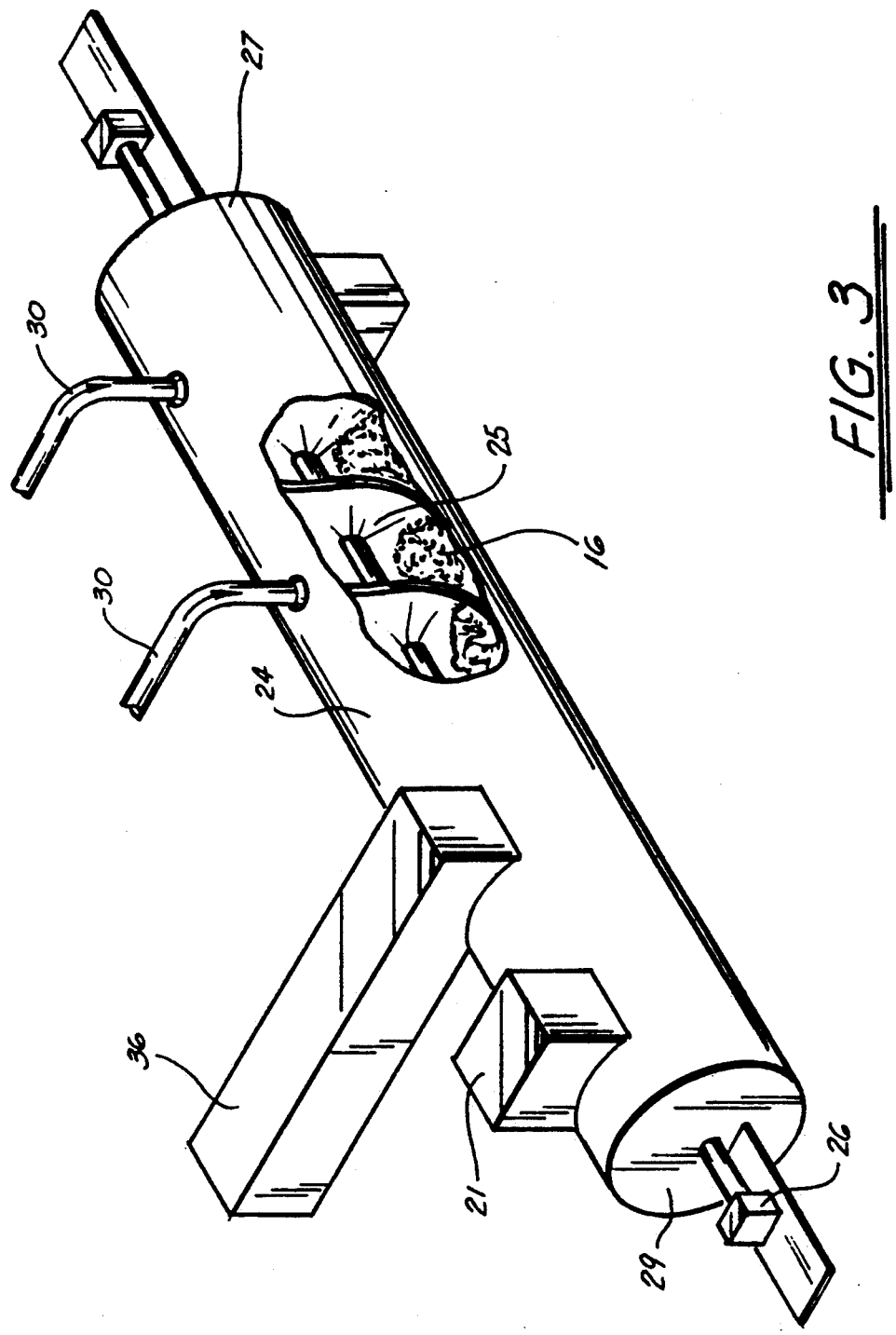
FIG. 3 is an isolated partial cut-away of one of the heating chambers in the heating chamber portion of the preferred embodiment of the system of the present invention.

The waste materials 16, as seen in FIG. 1A, would then be conveyed via a plurality of feed augers 18, each of which would convey the waste material through auger 18 and deposit the waste via a chute 21 into a three horizontally disposed heating chambers 24 of the type that were disclosed and claimed in U.S. Pat. No. 4,606,283, which has been incorporated by reference thereto. Each of the heating chambers 24, as disclosed in the '283 patent, would include an auger 25, (see FIG. 3), turned by motor 26 which would convey the material from the first end 27 of each of the augers 24 to the second end 29 and the waste materials would be heated preferably to a temperature optimumly between 212° F. to 300° F., which would vaporize water and light hydrocarbons, which would be removed at low temperatures, or in this case, at 212° F. (the boiling point of water). As if further illustrated, in order to prevent inadvertent ignition of any volatile compounds during the heating process through chambers 24, there is provided a pair of inert gas feeds 30 (see FIG. 3), each of the feeds 30 injecting inert gas into each of the heating chambers. For purposes of definition, the inert gases that may be introduced into the chamber are nitrogen or carbon dioxide, or any other inert gas which may be utilized to prevent ignition of hydrocarbons vapors in the chambers as well as concurrently act as a carrier.

As illustrated, there is further provided a removal means 32 for removing vapors out of each of the chambers. The exhaust means comprising an exhaust line 34 receiving vapors from each of the chambers, 24, and moving the chambers into an exhaust manifold 36. In the preferred embodiment there is illustrated, a pair of exhaust manifolds for receiving the volatile vapors, with the vapors moving from the manifold into a vapor line 38, wherein the vapors would then be conveyed through a main vapor line 40 for feeding the vapors into a cyclone separator 42, the function of which will be discussed further. As seen in FIGURE since there are three levels, i.e., the upper level 44 of heating chambers 24, the intermediate level 46, and the lower level 48, feeding chambers 24, each of the levels 44, 46, and 48 would be provided with its own exhaust manifold 36, exhaust line 38, and exhaust conveying line 40, in order to convey the exhaust from the three sets of heating chambers into the cyclones. Therefore, as seen in FIG. 1, there are three separate exhaust lines 40, feeding into the cyclones, for the very reason that each of the three levels of heating chambers has its own exhaust line.

Returning to the function of the cyclones 42, cyclones 42 would be the standard type of cyclone separator wherein any solid materials contained within vapors in vapor line 40 would be dropped into the lower cone portion 43 of cyclone 42, and would be conveyed via lines 45 into the hopper 14, for the purpose of moving of the solids back through the system. The vapors would then move into vapor transport lines 50 for additional processing, as it will be discussed further.

Returning now to the movement of the waste materials through the heating chambers 24, after the solids have moved through the first level of chambers 44, and the vapors had been removed into exhaust manifold 36, the solids upon reaching the end portion 29 of heating chamber 24, would then be gravity fed into the next level of heating chambers 46, and would be conveyed in the direction of arrows 47, as seen in FIG. 1, in the second path in the direction of arrow 47, the material would vaporize at a temperature between 300° F. to 900° F. That is, any remaining water and liquid hydrocarbons, which are those hydrocarbons which are liquid at normal atmospheric conditions, for example, remaining gasoline and oil would then be removed through vaporization. These vapors would likewise follow the same path from the second set of heating chambers 46, into the cyclone separators via vapor lines 45 as was discussed earlier.

Following the movement of the waste material through the second layer of chambers 46, the materials upon reaching the end 31 of second layer of chambers 46, would then be gravity fed into the third level 48 of chambers 24, and would then be conveyed in the direction of arrows 49 to the end 33 of these particular chambers. The third and final pass through the third chambers 24 would be to remove those materials which are heated to between 900° F. and 2100° F., would vaporize the remaining heavy hydrocarbons and other volatile. For example, solid hydrocarbon that may be removed may be asphalt or paraffin tars depending on the pressure and the temperature that would be reached within the heating chamber.

Following the passing of the waste material through the third chamber, the solid waste upon reach the end 33 of the third level of chambers 48, would then be conveyed via transverse auger 51, and would be removed from the system for further usage of and ultimately disposed of.

Figure 2:
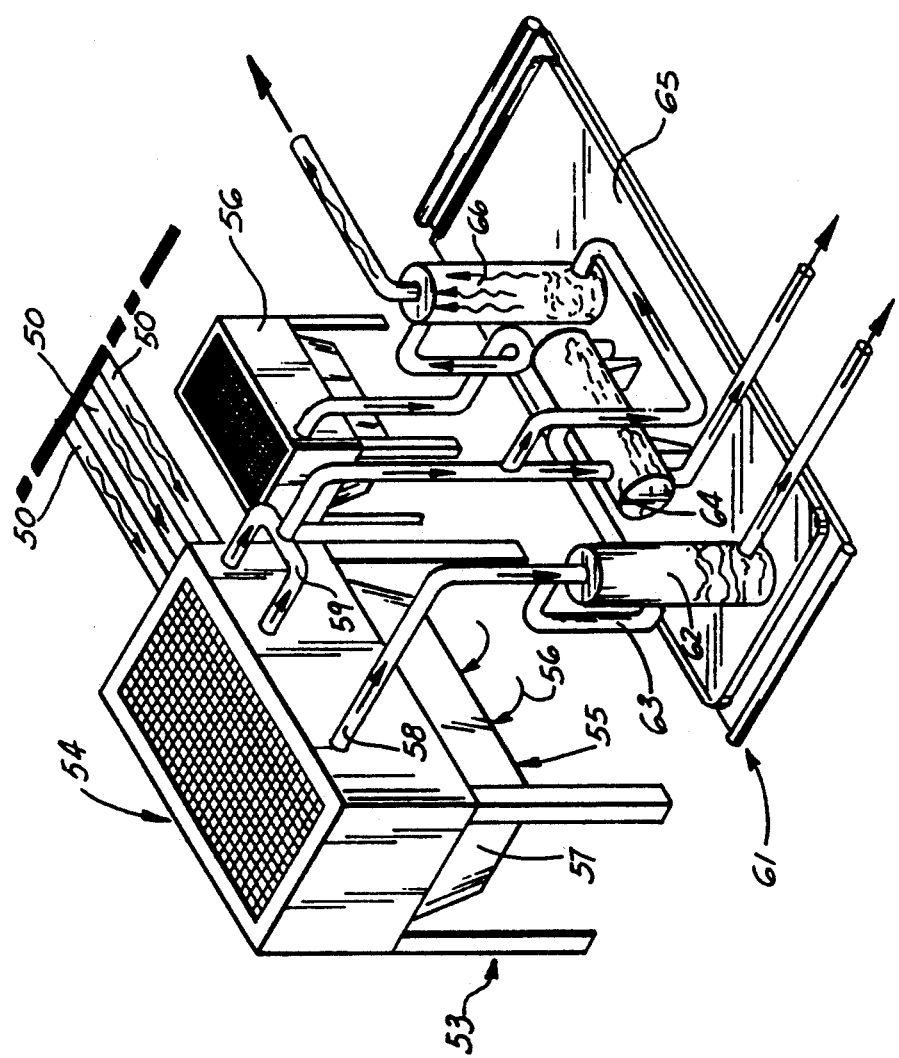
FIG. 2 is an overall view of the air coolers and distillation portion of the preferred embodiment of the system of the present invention.

Reference is now made to that portion of the system for treating the vapors that have been received from the individual heating chambers 24, into vapor manifold 36, routed to separator cyclones 42 for removal of the solids and reinsertion into the heating process, and have entered line 50 towards the means for treating the vapors, as seen in FIG. 2.

The process by which the hydrocarbon gases in lines 50 are cooled and condensed would be through the utilization of an air cooling means 54 which comprises substantially three air coolers for receiving the vapors from lines 50, so as to cool the hot vapors down to 120° F. The remaining portion of the stream comprises the carrier gas, i.e., the inert gas such as nitrogen gas. For purposes of the preferred embodiment, the air coolers would comprise a plurality of pipes through which outside air 56 is blown in via fans 55 through the bottom 57 of the air cooling chamber 54, and the air in effect would surround the plurality of pipes through which the vapors are travelling via lines 50, and would cool the vapors therein, for exiting the air cooling chamber 54, via lines 58 and 59.

In order to achieve economics of scale, the gas stream leaving the air cooler via lines 58 and 59 would usually be combined with the gas stream from other parallel distillation trains for further processing. The first step in this portion of the process is the three phase separator or the water phase and the oil phase recovered from the gas phase. As seen in FIG. 2, there is provided a first hot two phase separator 62, wherein the oil and gas mixture is condensed, and the water is not condensed and removed line 63 into a three phase separator 64. The oil is then collected via line 65 for resale. The vapors would then move into three phase separator 64, for further condensation. The gas phase would proceed to two parallel gas compressors which raises the pressure to 100–125 psi due to the elevation of pressure above the vapor pressure of condensed liquids. The gas stream would then next move to a dryer to remove water prior to gas insertion into a refrigeration unit. In the initial paths through the first chamber, the waste materials would be heated to a temperature optimally between 212° F. to 350° F., which would vaporize water and light those hydrocarbons which boil at low temperatures, or in this case, at 212° F. (the boiling point of water).

In the second paths of the material through the second chambers, those waste materials which would vaporize at a temperature between 300° F. to 900° F., would be volatilized, that is any remaining water and liquid hydrocarbons, which are those hydrocarbons which are liquid at normal atmosphere conditions, for example, gasoline and oil.

The third and final paths through the third chambers, would be those materials which are heated up between 900° F. and 2100° F., which would vaporize the remaining heavier hydrocarbons nd other volatile. For example, such a solid hydrocarbon may be asphalt or paraffin tars depending on the specific constituents involved.

Following the passing of the waste material through the third chamber, through which the materials are heated up to 2100° F., the hot volatilized gases from each of the three chambers would be cooled and condensed in order to recover any water, oil, or liquid petroleum gas. The process by which the hot gases are cooled and condensed would be the utilization of three air coolers per chamber section, in order to cool the hot vapors down to 120° F. or 220° F. The remaining portion of the stream would be mostly the carrier gas i.e., inert nitrogen gas. For purpose of the preferred embodiment, the air coolers would utilize outside air to cool the gases as opposed to the cooling water. The gas stream next goes through the separator, compressor then the dryer to remove water and then a refrigeration unit.

The movement of the gas stream into the refrigeration unit will allow additional hydrocarbons to be recovered at this point. The gas stream is analyzed for hydrocarbons with a certain portion being purged to a flare. Then fresh nitrogen is added to replace losses of gases sent to flare, and the stream is now ready to recycle to the units. In the preferred embodiment of the process, the distillation process is designed to and would be used to process substantially 88 tons per day of filter pressed generated waste, as discussed earlier. Estimated affluent yields in the preferred embodiment are foreseen as follows:

| | |
|---|---|
| Inert solids - | 31 Tons Per Day |
| Water - | 250 Barrels Per Day |
| Oil - | 80 Barrels Per Day |
| Liquid Petroleum Gas (LPG) - | 108 Barrels Per Day |
| Non-Condensable Hydrocarbons Gases (Methane or Ethane) - | 190 Pounds Per Day |

In the embodiment which includes two equally spaced injection ports in each of the three chambers, which would mean a total of 18 injection points per train i.e., each of the nine chambers having two injection points each.

For purposes of instruction, as illustrated, heating chamber assembly 10 would be set upon a skid 13, so that it may be positioned on a rig or the like during use quite efficiently, and due to its unique construction of the stacking of the chambers, occupy less space than would normally be utilized. Furthermore, as illustrated the unit is powered by an electrical power source 15, which would supply the electrical heating elements in each of the heating chambers in order to heat the chambers to the desired temperature. Furthermore, as illustrated in FIG. 2, the vapors are processed through line 50 from the heating chambers, which include the air cooling unit 53 which comprises the air coolers 54 and 56, and the distillation skid 61, which like the heating chambers is also provided on a movable skid 65 so that the unit may be again easily moved and set up on site.

It is foreseen that for the maximum efficiency to be achieved in practicing the above-referenced process, that the process be controlled and operated through a sophisticated computer system to achieve the optimum monitoring of the overall operation. The unique system would be, in the preferred embodiment, as detailed below.

A control theory was developed based on data collected during testing in Houston, Tex. This control theory is used to control the heating of the chambers.

Figure 6:
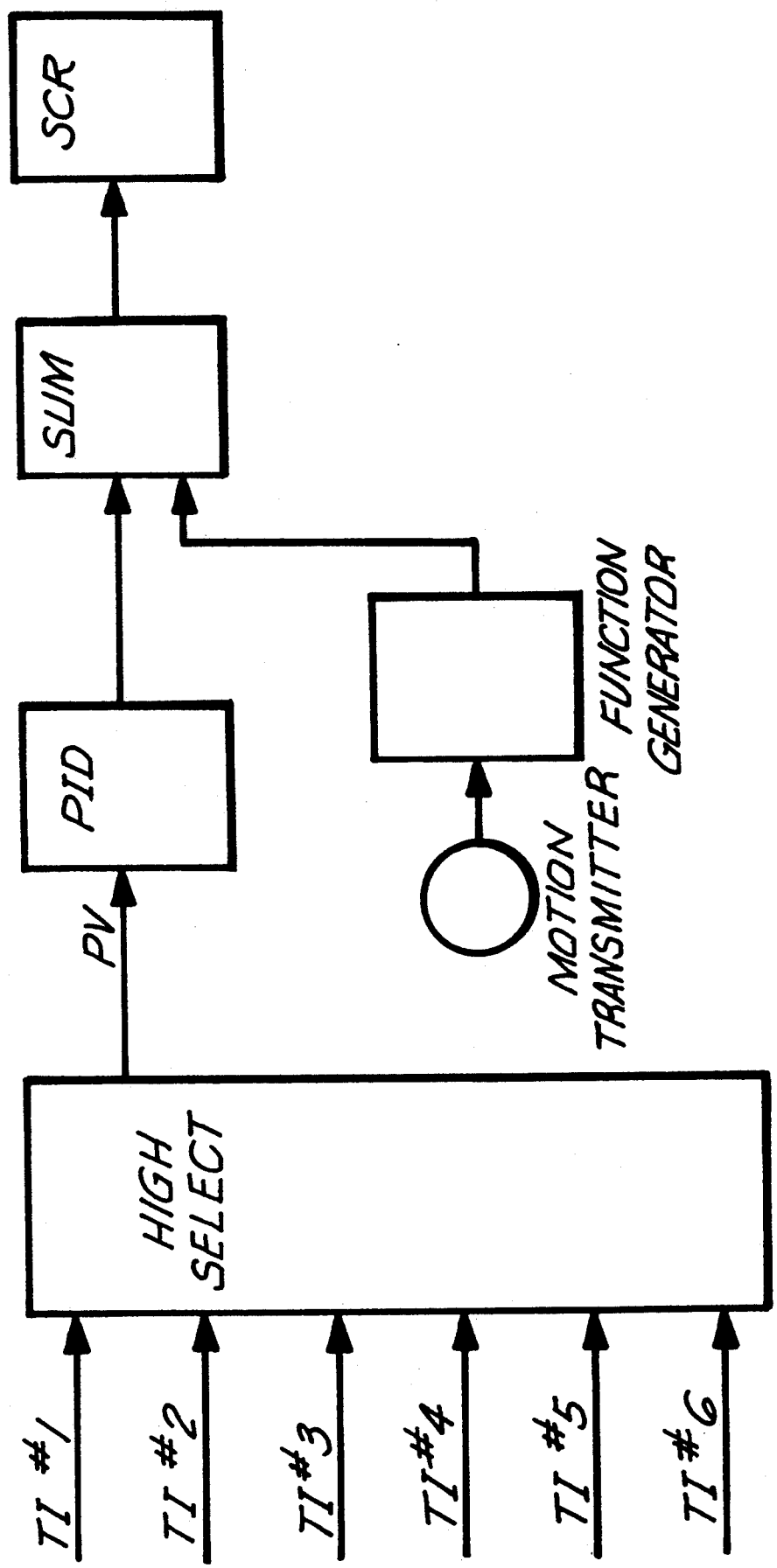
FIG. 6 illustrates the function of the motion detector through the operation software of the system and FIGS. 7A-1 through 7A-9 contain Table I, which is a breakdown of various compounds making up a feedstock in a law environmental case study.

In the preferred embodiment of the system of the present invention, there would be further included a means for detecting any deflection of the shape of the thermal distillation chambers due to the excess heat of the chamber, and the passage of the waste material therethrough. The motion detector, which would be controlled by the software, a schematic of which is depicted in FIG. 6, would provide that the heat applied to each of the chambers be regulated when a minute deflection in the wall of the chamber is detected, so as to avoid any possible malfunctioning of the auger system as it operates during the thermal distillation process occurring in that particular chamber. However, it should be made clear that the motion detector is utilized in the pre-operation, during operation, and post-operation of each of the chambers as the chamber is either heating up, in full operation, or is cooling down after the process has been undertaken.

As seen in FIG. 6, there are two main inputs and one output in the algorithm. The first main input is the thermocouple (TI), which is used for the process variable. There are six thermocouples, three located across the top of the heating chamber and three located across the bottom of the heating chamber. All six thermocouples send temperature data to the Bailey Control System. The software selects the thermocouple with the highest temperature and inputs this value as the process variable (PV) into the proportional, integral, derivative (PID) calculation.

The second main input is the motion transmitter located on the bottom middle shoe of the heating chamber. The motion transmitter detects the vertical movement of the chamber. When the chamber is at ambient temperature, the motion transmitter sends a zero value to the Bailey Control System. When the middle of the heating chamber moves in the downwards direction from the zero mark, the motion transmitter sends negative value. When the middle of the heating chamber moves in the upwards direction from the zero mark, the motion transmitter sends a positive value. The value from the motion transmitter is sent to a function generator. The value sent from the motion transmitter to the function generator is scaled from −50.0 to +50.0 units. The function generator is tuned to provide a zero output when the input is between −30.0 and +30.0. If the input is less than −30.0, then the output will be a negative number in proportion to the input. If the input is greater than +30.0, then the output will be a positive number in proportion to the input. The output of the function generator is sent to the second input of a SUM calculation.

The output of the PID calculation is sent to the first input of the sum calculation. The output of the PID calculation and the output of the function generator are summed. The result is sent to the silicon controlled rectifier (SCR) control input which controls the amount of heat on the heating chambers.

The function of this logic is if the heating chamber moves in the downward direction, the output to the SCR is reduced proportionately to the amount of downwards movement. If the heating chamber moves in the upwards direction, the output to the heating chamber moves in the upwards direction, the output to the SCR is increased proportionately to the amount of upwards movement. This increasing and decreasing of output to the SCR reduces the amount of deflection of the heating chamber.

The reduction of the amount of deflection of the heating chamber reduces the wear of the heating chamber, auger, bearings, hydraulic motor, U-joints, chamber dumps and vapor manifolds. This reduction also reduces the buildup of material on the chamber walls and inside of the chamber dumps. The integrity of the chamber alloys is retained due to the non-allowance of bending, which without such control would result in metallurgy failure and the inability to operate at desired temperatures.

The entire control process optimize a maximum heat and flow rates which are governed by the motion transmitter and its associated logic, as depicted in FIG. 6.

Through the unique combination found in the system of the present invention, the results of the process which have heretofore not been accomplished in the processing for the purpose of recycling of a diverse waste stream, are as follows:

1. The removal, from solids, of all volatile, base/neutral, acid extractable hydrocarbon constituents analyzed for in EPA method 8240 and 8270 (See Table 1).

2. The recovery, in a reusable form, of all the removed volatile, base/neutral, acid extractable hydrocarbon constituents analyzed in EPA method 8240 and 8270.

3. The removal, prior to release to the environment, of any toxic compounds as further described in EPA Appendix 8 (See 40 CFR). This removal is accomplished via sub 0 degree F. refrigeration thus allowing for the recovery and reuse of specific constituents.

Heretofore, the waste treatment Industries BACT (Best Available Control Technology) has been oxidation (such as incinerators afterburners) or actuated carbon absorption systems. Oxidation process generate SOx and NOx as by-products of oxidation/burning. Both NOx and SOx are considered to have detrimental effects on the environment and the general public's health.

4. The capability of accomplishing the aforementioned without any element of combustion.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A process for thermally distilling a waste stream containing hydrocarbons, comprising the following steps:
   a) introducing the waste stream into an externally heated chamber;
   b) transporting and agitating the stream through a first heat phase of the externally heated chamber;
   c) heating the waste stream during the first heat phase to form specific gasified constituents;
   d) introducing a carrier gas to the waste stream at near atmospheric pressure;
   e) removing the gasified constituents from the stream of the carrier gas;
   f) transforming the gasified constituents into separate liquid, solid or gas forms; and
   g) introducing the remainder of the waste stream into at least a second heat phase of the externally heated chamber at a higher temperature than the first heat phase in order to gasify other specific constituents.

2. The process in claim 1, wherein the waste stream is conveyed to the first chamber from a waste-storing hopper which operates in a nitrogen atmosphere.

3. The process in claim 1, wherein the waste stream is transported and agitated in the chamber via a screw auger.

4. The process in claim 1, further comprising the step of conveying the non-evaporated portion of the waste stream into a second heat phase after the waste stream has passed through the first heat phase.

5. The process in claim 4, wherein the second heat phase is at a higher temperature higher than the temperature of the first heat phase in order to remove volatile and semi-volatile with higher boiling points than the previous chambers operating temperature (the first heat phase).

6. The process in claim 1, wherein the inert gas medium may comprise nitrogen, carbon-dioxide, and/or other non-combustible gases.

7. The process in claim 1, further comprising the step of conveying the waste to a third heat phase for conveying the waste stream at a higher temperature than the proceeding phase (second heat phase), so that additional compounds may be vaporized out of the waste stream by providing sufficient retention time at various temperatures.

8. The process in claim 1, wherein those compounds evaporated out of the first phase would be compounds which vaporize in the range of 80° F. to 300° F.

9. The process in claim 2, wherein compounds in the second phase are heated to a temperature of between 300° F. to 900° F.

10. The probes in claim 1, wherein in the third heat phase, the compounds are heated to a temperature of 900° F. to 2100° F.

11. The process in claim 1, wherein the compounds which are vaporized out of the first heat phase at 300° F. are water, and light hydrocarbons.

12. The process in claim 9, wherein the impure constituents which are vaporized out of the second chamber heat phase at 300° F. to 900° F. are heavy hydrocarbons and creosote.

13. The process in claim 1, wherein the compounds which are vaporized out of the third heat phase at greater than 900° F. are asphalt, PCB's and paraffinic tars.

14. The process in claim 1, wherein the use of an inert gas transport medium eliminates the possibility of oxygen within the waste stream from uniting with elements or from causing combustion within the process.

15. The process in claim 1, wherein the materials that have not been vaporized out of the stream are conveyed out of the chamber as inert solids for disposal.

16. The process in claim 1, further comprising the step of detecting the deflection of the chamber prior to, during, and following the thermal distillation of the waste stream in the chamber.

17. A process for evaporating out particular compounds from a waste stream containing hydrocarbons, through heat retention, the process comprising the following steps:
   a) providing a chamber for receiving a waste stream;
   b) heating the chamber through an external heat source to a first temperature;
   c) introducing the waste stream into the heated chamber at the first temperature;
   d) monitoring the heated chamber to detect any deflection in the shape of the chamber wall during heating;
   e) conveying the waste stream through the heated chamber for a certain amount of time so that compounds with boiling points below operating temperatures are vaporized and removed from the stream;
   f) conveying the vaporized constituents via an inert gas medium through an air cooler;
   g) repeating the steps of a) through f) through subsequent externally heated chambers, each of the chambers retaining the waste stream at a temperature higher than the preceding temperature and for a particular amount of time, to separate compounds out from the waste stream depending on the boiling point of the compound to be vaporized from the stream; and
   h) further processing the bas stream to remove impurities such that the stream can be recycled back to the distillation unit.

18. The process in claim 17, wherein the materials that have not been vaporized out of the stream are conveyed out of the chamber as clean residual solids for disposal.

19. A process for vaporizing and removing compounds from a waste stream containing hydrocarbons, through heat retention, the process comprising he following steps:
   a) providing a series of externally heated chambers;
   b) introducing the waste stream into a first chamber of the series which is at a first temperature;
   c) conveying the waste stream through the first chamber for a certain amount of time so that compounds with boiling points below operating temperatures of 300° F. are vaporized from the waste stream;
   d) conveying the vaporized constituents via an inert gas medium through an air cooler;
   e) gravity feeding the remainder of the waste stream through a second chamber of the series of chambers for a certain amount of time so that compounds with boiling points of between 300° F. and 900° F. are vaporized from the waste stream;
   f) gravity feeding the remainder of the waste stream through a third chamber in the series of chambers so that compounds with boiling points between 900° F. and 2100° F. are vaporized from the stream;
   g) conveying the vaporized streams from the first chamber, second chamber, and third chamber, via an inert gas medium for removal of entrained solids within the gas stream; and
   h) conveying the vapor laden inert gas stream to an air cooler for recondensation of the stream, and further processing the stream.

20. The process in claim 19, wherein following the condensation of the stream in the air coolers, the stream is moved to a separator for removal and recovery.

21. The process in claim 19, wherein the stream may be further cooled, and condensing additional portions and upon further condensation of the stream, the non-condensed gases may be conveyed to compressor, dryers, refrigeration units, or recycle through the system.

22. The process in claim 19, wherein the materials that have not been vaporized out of the stream are conveyed out of the chamber as inert solids for disposal.

23. The process of claim 19, wherein the resultant stream, after distillation, contains non-detectable concentrations of hazardous hydrocarbons.

* * * * *